Jan. 3, 1956  G. A. LYON  2,729,512
WHEEL COVER
Filed Sept. 23, 1953
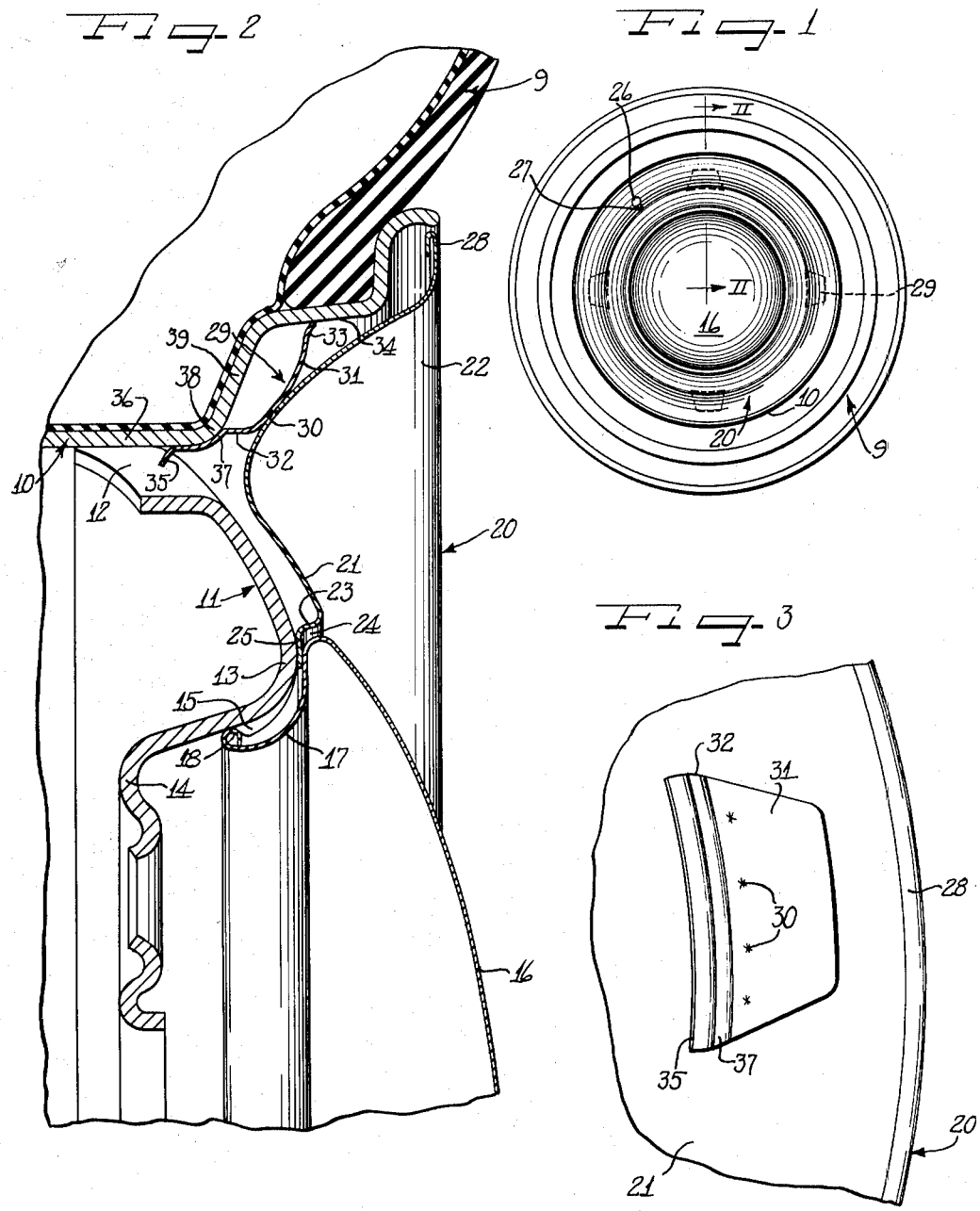
Inventor
George Albert Lyon United States Patent Office 2,729,512
Patented Jan. 3, 1956

2,729,512

WHEEL COVER

George Albert Lyon, Detroit, Mich.

Application September 23, 1953, Serial No. 381,793

13 Claims. (Cl. 301—37)

The present application is a continuation in part of my application, Serial No. 275,875 filed March 11, 1952, now abandoned.

This invention relates to a wheel structure and more particularly to an ornamental cover therefor.

An object of this invention is to provide an automobile wheel cover with improved retaining and centering means.

Another object of this invention is to provide a detachable wheel cover which lends itself to economical manufacture from sheet metal.

Yet another object of this invention is to provide a wheel cover with retaining means which also serves as a means for centering the cover on the wheel as it is pressed home into retained position.

In accordance with the general features of this invention there is provided in a wheel structure including a wheel having multi-flanged tire rim and body parts with spaced wheel openings adjacent their junction, a circular wheel cover disposed on the wheel over the junction of the parts thereof, and means for centering and retaining the cover on the wheel comprising a plurality of elements fastened at spaced points to the back side of the cover, each element including a finger for retainingly gripping a flange of the rim part and each element having another finger positioned to extend into a wheel opening to engage a wheel part therein for centering the cover on the wheel.

Another feature of the invention relates to the fastening of each of the retaining and centering elements by a weld connection to serve as a fulcrum point for each of the fingers of said elements extending in opposite directions from the weld.

Other objects and features of this invention may more fully appear from the following detailed description taken in connection with the accompanying drawings which illustrate several embodiments thereof and in which Figure 1 is a side view of a wheel structure having a cover applied thereto embodying the features of this invention and showing by dotted lines the retaining finger elements;

Figure 2 is an enlarged fragmentary cross-sectional view taken on substantially the line II—II of Figure 1 looking in the direction indicated by the arrows; and Figure 3 is a fragmentary rear view of the portion of the cover showing one of the fastening elements secured thereto.

As shown on the drawings:

My cover invention is applicable to a conventional type of automobile wheel assembly. Such an assembly includes a pneumatic tube and tire 9 mounted in the usual manner upon the steps or flanges of a multi-flanged drop center type of tire rim 10, which in turn is carried by a central wheel body part 11. The wheel body or spider part 11 comprises a dished metallic stamping fastened at spaced intervals to the base flange of the rim part 10, leaving the usual wheel openings 12 between the points of fastening. The body part 11 also includes a bulged central nose portion 13 which terminates in an indented bolt-on flange 14 which can be secured by the customary cap screws or bolts (not shown) to a part on an automobile wheel axle.

The nose portion 13 of the body part 11 has spaced inclined hub cap retaining bumps or protuberances 15 at its inner side. Detachably cooperable with those bumps 15 is a metallic shell-like hub cap 16 having an underturned skirt 17 telescoping the nose portion 13 and terminating in a curled edge 18 adapted to be snapped over and behind the bumps 15. This hub cap may be removed by a screwdriver or other pry-off tool to afford access to the bolt-on flange 14 when it is desired to remove the wheel from the axle.

Cooperable with this wheel is a circular wheel cover 20 embracing the features of this invention. This cover is made of any suitable sheet material, such, for example, as sheet steel, and includes radially inner and outer divergent portions 21 and 22. In other words, the cover 20 is of a dished cross-sectional configuration.

The inner margin of the cover is indented at 23 to provide a space 24 between the cover and the outer edge of the hub cap to permit of the introduction of the end of a pry-off tool under the edge of the hub cap in the removal of the hub cap. The dished flange 23 serves as a shoulder for the pry-off tool to engage in the ejection of the cap. In addition, if it is so desired, the inner edge of the cover 20 may be extended radially inwardly at 25 so as to underlie the edge of the cap. In this way the cover can also be clamped by the cap to the body part. In any event the flange 25 whether it extends under the cap or not should preferably bottom against the nose portion 13 of the body part so that the body part constitutes an abutment against which the cover is firmly retained.

The cover may also include the usual valve stem hole 26 (Figure 1) through which the conventional valve stem 27 from the tire and tube assembly 9 may extend. I also preferably form the cover 20 with a turned edge marginal flange 28 spaced from the opposite flange of the rim part 10 so as to provide clearance for the accommodation of the usual wheel balancing weight (not shown) carried by the outer edge of the tire rim. Such spacing also permits movement of air behind the cover and through the wheel openings 12.

This cover of my invention is preferably made in the form of a stamping and any suitable curling tool may be employed for forming the turned outer edge of the cover. This cover may be given any desirable external finish, such, for example, as a high lustrous finish. If it is made of stainless steel, as is very commonly used in wheel covers, it may be given a high buff finish.

In order to retain this cover 20 on the wheel there is attached to the rear side of the cover portion 22 adjacent the junction of the wheel parts a plurality of spaced retaining and centering elements 29 welded at 30 to the cover. These elements may be made of spring steel and each of them is preferably made in one generally L-shaped piece and includes a generally radially outwardly projecting retaining finger 31 and a generally axially extending centering finger 32. These fingers are connected together at the welds 30 so that the welds in reality constitute a fulcrum point for each of the fingers in the use and operation of the cover.

Each of the retaining fingers 31 has a slightly outwardly angled or turned edge or extremity 33 for facilitating sliding of the finger over a flange 34 of the tire rim part when the cover is pushed home. Moreover, each of the fingers 31 is slightly bowed outwardly so that when a pry-off tool is applied to the edge 28, the finger can buckle in disengaging itself from the flange 34. The pry-off tool, which may be a screwdriver, can fulcrum on the outer edge of the tire rim in the removal of the cover. Moreover, the dished configuration of the cover rigidifies the cover and assists in preventing buckling or distortion of the cover under the effect of the pry-off force.

The extremity of the centering finger 32 may be turned at 35 inwardly so as to present a smooth surface for sliding tensioned engagement with a base flange 36 of the tire rim part.

In order to provide an effective stop to limit axially inward movement of the cover in applying the same to the wheel and thus avoid possibly canted disposition of the cover, each of the centering fingers 32 is preferably also provided with an intermediate generally radially outwardly and axially inwardly directed shoulder 37 arranged to engage against a juncture shoulder 38 on the tire rim where the base flange 36 joins a side flange 39 of the tire rim. Thus, by engagement of the finger shoulders 37 against the tire rim shoulder 38 axially inward disposition of the cover 20 is positively limited and the cover will in the final assembly with the wheel be held in proper plane relation to the wheel and properly spaced from the tire rim.

In the use of the cover the hub cap 16 is first removed and then the cover is placed over the wheel. The hole 26 is aligned with the valve stem 27 so that the valve stem can project therethrough and thereafter the cover is pressed axially inwardly against the wheel. In the course of this movement of the cover inwardly, the fingers 31 slide along the inclined surface of the flange 34 of the rim part and the fingers 32 enter the wheel openings 12 and bear against the base flange 36 of the rim part so as to center the cover on the wheel.

This inward movement of the cover will continue until the inner marginal flange 25 bottoms against the body part 11 and the finger shoulders 37 bottom on the tire rim. Thereafter the fingers 31, which have their outermost extremities normally in a circle of a diameter slightly greater than that of the surface of the flange 34, have a tensioned gripping engagement with the flange 34 for holding the cover 20 on the wheel.

By this arrangement I am enabled to have the dished portion of the cover extend into a position in close proximity to the junction of the wheel parts so that the cover closely follows the contour of the stepped flanges of the tire rim part thereby providing a highly desirable ornamental effect.

Attention is directed to the fact that while the wheel cover is shown with a detachable center hub cap 16, the hub cap 16 could, as is well known in the art, also be made integral with the cover inasmuch as the retaining fingers are sufficiently strong to hold the cover on the wheel regardless of whether it be in the form of an annulus or full disk.

I claim as my invention:

1. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including a finger for retainingly gripping a flange of the rim part and each element having another finger positioned to extend into a wheel opening to engage a wheel part therein for centering the cover on the wheel.

2. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including generally opposite extending fingers comprising a finger for retainingly gripping a flange of the rim part and a finger positioned to extend into a wheel opening to engage a wheel part therein for centering the cover on the wheel, and each of said fastenings for said elements comprising a fulcrum point for both of the fingers of each element.

3. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including generally oppositely extending fingers comprising a finger for retainingly gripping a flange of the rim part and a finger positioned to extend into a wheel opening to engage a wheel part therein for centering the cover on the wheel, and each of said elements being fastened between the fingers to the cover by a weld joint which comprises a fulcrum point for each of the fingers of the element.

4. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including generally oppositely extending fingers comprising a finger for retainingly gripping a flange of the rim part and a finger positioned to extend into a wheel opening to engage a wheel part therein for centering the cover on the wheel, and said fingers of each element diverging from the fastening therefor, the centering finger extending generally axially of the wheel and the retaining finger extending generally radially of the wheel with a portion of the tire rim projecting between the fingers.

5. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including generally oppositely extending fingers comprising a finger for retainingly gripping a flange of the rim part and a finger positioned to extend into a wheel opening to engage a wheel part therein for centering the cover on the wheel, the outer edge of said cover being spaced from the tire rim part and the inner margin of the cover being bottomed on the body part.

6. As an article of manufacture, a cover for a wheel including flanged tire rim and body parts and in which the rim includes an axial base flange joined by a shoulder to a radial inclined side flange, said cover being of circular shape and having fastened to the rear side cover-centering and retaining means, said means comprising a generally radially outwardly extending cover retaining finger and a generally axially extending centering finger, said fingers being integral resilient portions of a single element and diverging from a point of attachment to the cover with one of the portions extending axially for cooperation with the base flange and the other extending generally radially over said radial rim flange for gripping the rim, said portions being spaced to receive between them said rim shoulder.

7. The wheel cover of claim 6 further characterized by each of said single elements being welded, between said portions thereof, to said rear side of the cover.

8. The wheel cover of claim 6 further characterized by one of said finger portions of each of said single elements being curved to bottom against and around said wheel rim shoulder.

9. The cover of claim 6 further characterized by the generally radially extending finger portion terminating in an angled extremity for gripping engagement with the rim.

10. As an article of manufacture, a cover for disposition at the outer side of a vehicle wheel having a body part and a flanged tire rim provided with axially outwardly and radially inwardly facing respective flanges, the cover comprising a body having portions thereof for disposition in overlying relation to the wheel body and the tire rim, the portion of the cover for overlying the tire rim having therebehind a series of retaining fingers provided with generally radially outwardly extending legs and generally radially inwardly extending legs, the radially outwardly extending legs having retaining terminals for engagement with the radially inwardly facing rim flange and the axially inwardly extending legs being engageable with the axially outwardly facing rim flange for maintaining the cover in spaced relation to the tire rim.

11. In a wheel structure including a wheel body and a multi-flange tire rim having axially outwardly and radially inwardly facing respective flanges, a cover for disposition at the outer side of the wheel including portions for overlying the wheel body and for overlying the tire rim, the portion for overlying the tire rim having secured therebehind a series of circumferentially spaced retaining clips provided with generally radially outwardly directed resilient legs having tips for retaining gripping engagement with the radially inwardly facing flange of the tire rim, and axially inwardly directed legs extending a substantial distance beyond the nearest portion of the cover and engageable as stops against the axially outwardly facing flange for supporting the cover in spaced relation to the tire rim.

12. In a wheel structure including a wheel body and a tire rim, a cover for the outer side of the wheel having a margin disposed adjacent to the tire rim, said margin having therebehind a set of retaining clips, said clips supporting the cover in spaced relation to the wheel and having first legs with retaining tips engaging a generally axially extending flange of the tire rim and second legs with shoulders bottoming against a generally radially extending flange of the tire rim.

13. A cover for disposition at the outer side of a vehicle wheel, a margin on the cover adapted to lie opposite a tire rim, said margin having therebehind a series of retaining spring clips having generally radially outwardly projecting retaining terminals, and generally axially inwardly projecting legs having portions intermediate the extremities thereof affording shoulders for engagement with one part of a tire rim while the retaining terminals engage another part of the tire rim.

References Cited in the file of this patent

UNITED STATES PATENTS

| | | |
|---|---|---|
| 2,193,104 | Lyon | Mar. 12, 1940 |
| 2,368,230 | Lyon | Jan. 30, 1945 |
| 2,368,235 | Lyon | Jan. 30, 1945 |
| 2,411,164 | Lyon | Nov. 19, 1946 |